(12) United States Patent
Slipy et al.

(10) Patent No.: US 8,897,033 B2
(45) Date of Patent: Nov. 25, 2014

(54) MODULAR KICKSTAND MECHANISM

(75) Inventors: Michael J. Slipy, Tamarac, FL (US);
Julio C. Castaneda, Coral Springs, FL (US); Travis R. Coleman, Sunrise, FL (US); Ryan M. Nilsen, Pompano, FL (US)

(73) Assignee: Motorola Mobility LLC, Libertyville, IL (US)

( * ) Notice: Subject to any disclaimer, the term of this patent is extended or adjusted under 35 U.S.C. 154(b) by 149 days.

(21) Appl. No.: 13/455,501

(22) Filed: Apr. 25, 2012

(65) Prior Publication Data
US 2013/0286623 A1 Oct. 31, 2013

(51) Int. Cl.
*H05K 5/00* (2006.01)

(52) U.S. Cl.
USPC .......... 361/807; 361/679.01; 361/679.02; 361/679.26; 361/679.27; 248/70; 248/73; 248/74.2

(58) Field of Classification Search
USPC ............ 361/679.01, 679.02, 679.26, 679.27, 361/679.3, 679.43, 679.44, 801, 807, 809; 248/70, 73, 74.2, 80, 127, 131, 136, 248/140
See application file for complete search history.

(56) References Cited

U.S. PATENT DOCUMENTS

| | | | |
|---|---|---|---|
| 7,519,388 B2 | 4/2009 | Vander Veen et al. | |
| 8,143,982 B1 * | 3/2012 | Lauder et al. | 335/219 |
| 8,244,319 B2 | 8/2012 | Paschke et al. | |
| 8,406,011 B2 * | 3/2013 | Lee et al. | 361/810 |
| 2005/0243522 A1 * | 11/2005 | Nilsen et al. | 361/716 |
| 2010/0123663 A1 * | 5/2010 | Leung et al. | 345/169 |
| 2010/0159997 A1 * | 6/2010 | Wang | 455/566 |
| 2010/0309617 A1 * | 12/2010 | Wang et al. | 361/679.01 |
| 2011/0051329 A1 * | 3/2011 | Huang | 361/679.01 |
| 2011/0164358 A1 * | 7/2011 | Duan et al. | 361/679.01 |
| 2011/0286171 A1 * | 11/2011 | Franz et al. | 361/679.21 |
| 2012/0275094 A1 * | 11/2012 | Zhou et al. | 361/679.01 |
| 2012/0303476 A1 | 11/2012 | Krzyzanawski et al. | |
| 2012/0314342 A1 * | 12/2012 | Sheu et al. | 361/679.01 |

OTHER PUBLICATIONS

Patel, Nilay: "Nokia N86 8MP features amazing active kickstand", Engadget.com, filed under Cellphones, posted May 1, 2009, http://www.engadget.com/2009/05/01/nokia-n86-8mp-features-amazing-active-kickstand/, all pages.

* cited by examiner

*Primary Examiner* — Robert J Hoffberg
*Assistant Examiner* — Hung Dang
(74) *Attorney, Agent, or Firm* — Leydig, Voit & Mayer, Ltd.

(57) ABSTRACT

An improved multi-purpose kickstand assembly 100 has a modular kickstand mechanism 134 to securely support an electronic communications device 102 in a landscape mode and/or portrait mode. One or more sensors in the electronic communications device can detect the position of a kickstand-magnet 156 secured to the kickstand 136 to electronically determine the position of the kickstand. The kickstand can serve as a channel 170 for a speaker port 166 and/or speaker 168 and can enhance antennae performance for improved audio quality.

20 Claims, 6 Drawing Sheets

MODULAR KICKSTAND MECHANISM

BACKGROUND OF THE INVENTION

1. Field of the Disclosure

The disclosure relates in general to a kickstand and, more particularly, to a kickstand for a portable electronic device.

2. Background Art

Over the years various kickstands have been marketed for use to support mobile phones and other portable electronic devices. Such conventional kickstands include HTC kickstands, Evo kickstands, 4G phone kickstands, and other types of kickstands. Many of these conventional prior kickstands are flimsy, awkward, and cumbersome, contain too much metal, are heavy, unstable, and/or defective. Furthermore, undesirably many of these conventional kickstands are not part of the mobile phone or other portable electronic device but are part of a separate protective carrying case which encloses or encases the mobile phone or other portable electronic device.

It is, therefore, desirable to provide an improved kickstand for use with mobile phones and other portable electronic devices, which overcomes most, if not all of the preceding disadvantages.

It is also desirable to create a drop-in kickstand mechanism assembly with minimal metallic components to achieve better weight reduction and minimal interference with antenna structures as well as provide functional capability for audio, high audio porting, and user interface with a hall-effect switch and magnet.

SUMMARY OF THE INVENTION

An improved kickstand provides a modular multi-purpose kickstand mechanism for use with mobile phones and other portable electronic devices which is effective, efficient and attractive. The lightweight kickstand comprises a drop-in kickstand mechanism assembly that has minimal interference with antenna structures as well as provides functional capability for audio, high audio porting, and user interface with a hall-effect switch and magnet. The user friendly kickstand is strong, sturdy, stable, easy to use and reliable. Advantageously, the multi-functional (multiple function) kickstand is operatively connected and integrally part of the mobile phone or other portable electronic device rather than part of a separate protective carrying case to enclose or encase the mobile phone or other portable electronic device.

The novel kickstand mechanism can rotate outwardly away from the phone or other electronic device, allowing a user to orient the phone or other electronic device in landscape mode at a prescribed angle.

This improved kickstand mechanism resolves prior problems and can include many unique features:
1. A small modular base can result in less metal and lighter weight and can cooperate with the kickstand for improved antenna performance.
2. A finger pick on the underside of the kickstand can provide easy affordance of the kickstand, and can also serve as an audio channel for a high audio speaker.
3. A small cylindrical depression can be provided underneath the kickstand to house a magnet, which when used with a hall-effect sensor inside the phone or other electronic device, relays to software in the circuitry of the phone or other electronic device, that the kickstand is open. There are several user interface (UI) features integrated into the kickstand sensing which results in improved user experience.
4. A slight angled surface at the contact end of the kickstand can be provided to increase the stability of the kickstand.
5. Kickstand opening feature creates an intuitive "push here" functionality to enhance ease of opening the kickstand.

The modular kickstand has superior technical merit and can encompass numerous areas:
a. Kickstand triggering UI change when the state of the kick-stand changes (opened vs. closed). This can be enabled by the magnet embedded in the kickstand tip and hall-effect sensor placed in the electronics device.
b. Fingerpick combined with a loudspeaker port.
c. Small modular base for the kickstand.

The modular kickstand mechanism can provide an integrated kickstand which is integrally connected to the portable phone or other electronic device. The modular kickstand mechanism provides a solution which is applicable across multiple platforms as a clean and space saving solution. Desirably, the modular kickstand mechanism also enhances audio quality of the mobile phone or other electronic device and prevents and minimizes blocking of the audio path.

The modular kickstand can be embedded or integrated with the housing of the mobile phone or other electronic communications device. The modular kickstand can have a fingerpick as well as a magnet that actives a hall-effect sensor which turns on the user interface (UI) for a landscape mode or portrait mode with an accelerometer.

In one embodiment, a kickstand assembly is provided with an electronic communications device which can be moveable from a landscape orientation to a portrait orientation and vice versa. The electronic communications device can comprise a housing having a front comprising a frame with a front surface and having a back with a back surface. An electronic visual display can be secured to the frame in proximity to the front surface for displaying images. A kickstand mechanism can be operatively connected to the back of the housing. The back of the housing can define a cavity which can provide a kickstand compartment for receiving the kickstand mechanism. The kickstand mechanism can include a kickstand comprising an arm with an inner end which is pivotally connected to the housing and can have an outer end positioned opposite the inner end. The outer end of the arm can be movable from a closed storage position within the kickstand compartment to an open position disposed outwardly of the kickstand compartment for supporting the electronic communications device in one of the orientations.

Advantageously, a magnet can be secured to the outer end of the kickstand and at least one sensor can be provided, such as in the interior circuitry of the electronic communications device and/or user interface (UI). The sensor cooperates with and senses the location of the magnet for detecting the position of the kickstand.

The kickstand mechanism can comprise a channel for an audio speaker and/or can comprise an antenna. The kickstand mechanism can define a speaker port and can have a portion for enhancing audio quality and substantially preventing blocking of an audio path to the speaker port. The kickstand mechanism can further comprise a portion for facilitating grasping of the arm and/or can comprise at least one cam for facilitating movement of the kickstand. The kickstand mechanism can include a biasing mechanism for biasing and urging the kickstand towards the open position. The kickstand can also have grooves for enhancing movement and pivoting of the kickstand to the open position.

The electronic communications device can include at least one control for controlling the display of the images. The electronic communications device can comprises a portable electronic device, such as: a radiotelephone, cellular (cell) phone, mobile phone, smart phone, qwerty phone, flip phone, slider phone, android phone, tablet phone, camera phone, clamshell device, portable networking device, portable gaming device, mobile communications device, personal digital assistant (PDA), wireless e-mail device, a two way pager, internet communication device, android tablet, ipod, ipad, kindle, electronic reading device, electronic photo frame, digital photo frame, digital picture frame, video player, audio player, electronic calculator, portable digital television (TV), electronic monitor, blackberry, tablet device, video device, computer, netbook, data sharing device, wireless device, handheld electronic communications device, and combinations of any of the preceding.

The kickstand assembly as described and recited in the pending claims produced unexpected surprisingly good results.

A more detailed explanation of the invention is provided in the following detailed descriptions and appended claims taken in conjunction with the accompanying drawings.

DETAILED DESCRIPTION OF THE INVENTION

The following is a detailed description and explanation of the preferred embodiments of the invention and best modes for practicing the invention.

Figure 1:
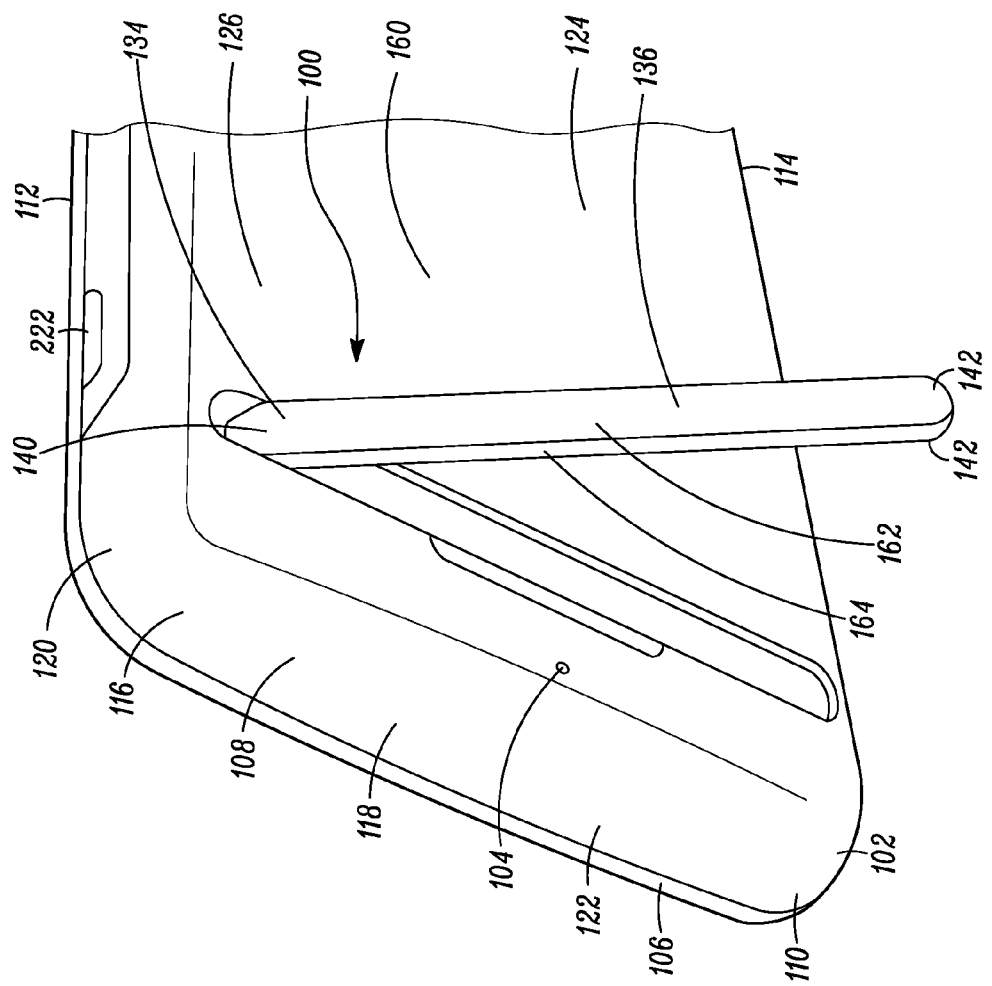
FIG. 1 is a reduced partial perspective view of a kickstand assembly with a modular kickstand mechanism in an open position and supporting an electronic communications device in a landscape orientation mode in accordance with principle of the present invention.
Figure 2:
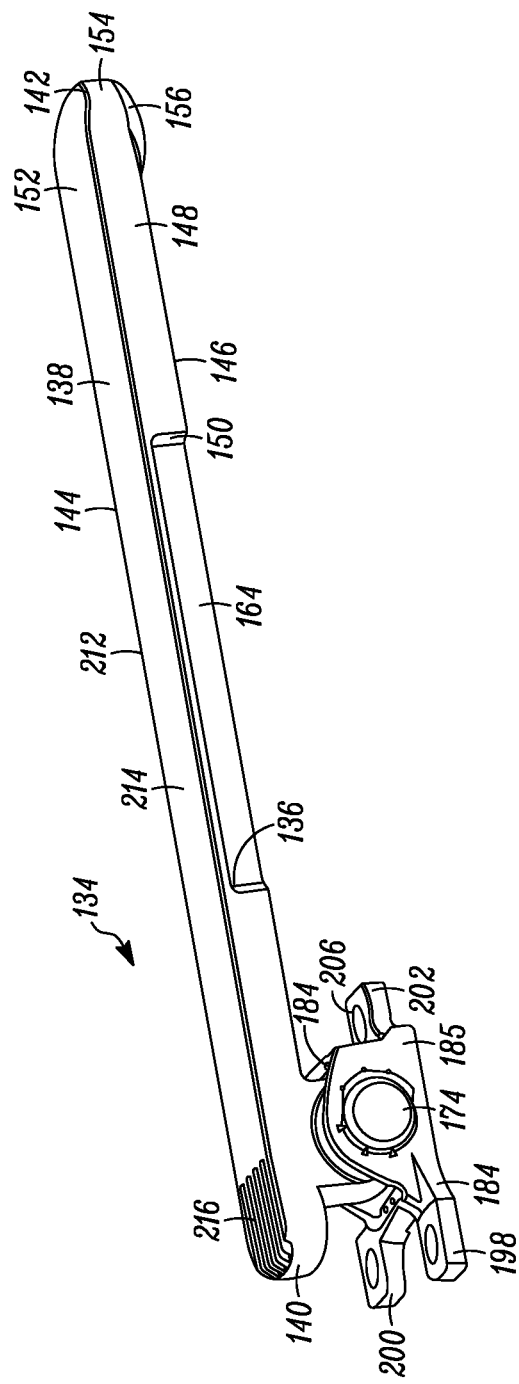
FIG. 2 is a perspective view of the modular kickstand mechanism in an closed storage position.

Referring to FIG. 1 of the drawings, a kickstand assembly 100 can be provided with an electronic communications device 102 which is moveable and pivotable from a landscape orientation mode (landscape mode or landscape orientation) to a portrait orientation mode (portrait mode or portrait orientation) and vice versa. The electronic communications device can comprise an electronic visual display 104 for displaying images 106. The electronic visual display can comprise a user interface (UI) 108. The electronic visual display can comprises a screen, such as an impact resistant screen, a display screen, a touchscreen, a screen with an accelerator, and combinations of any of the preceding screens. An impact-resistant housing 110 can have substantially parallel longitudinal sides 112 and 114, substantially parallel lateral sides 116 which can extend between and be connected to the substantially parallel longitudinal sides. The housing can also have a front 118 comprising a generally rectangular frame 120 with a front surface 122 and can have a back 124 with a back surface 126. The frame can be positioned peripherally about and secure the electronic visual display.

Figure 6:
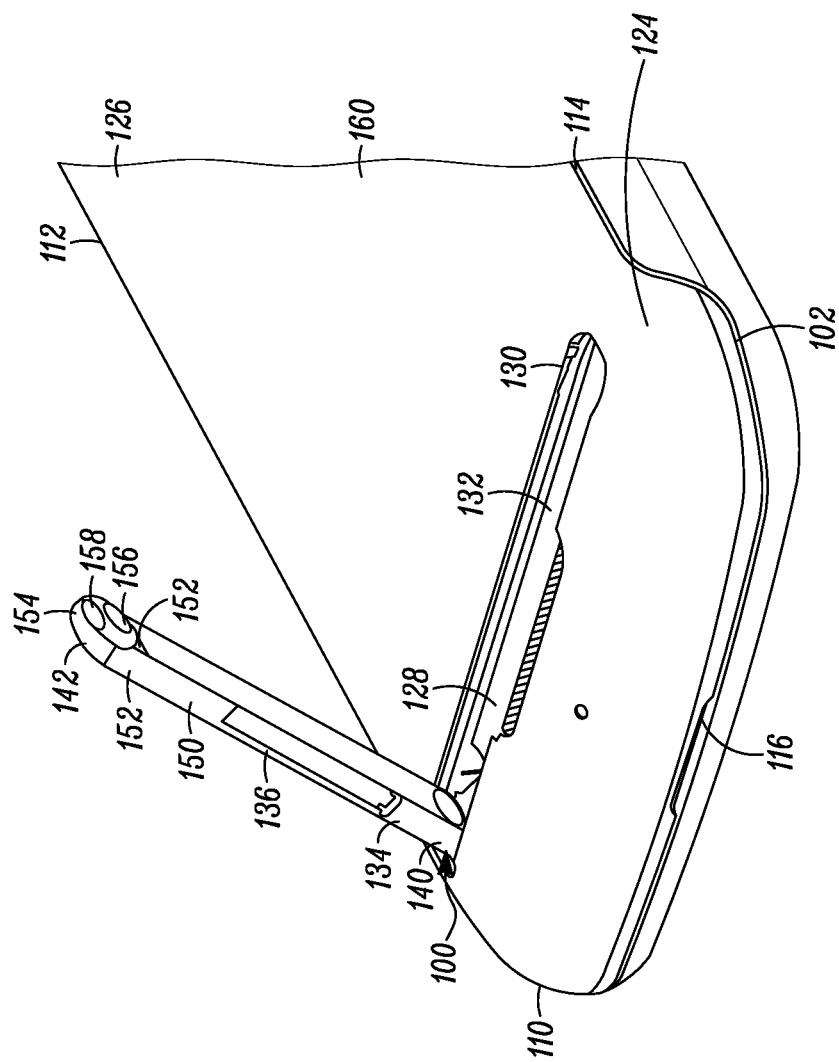
FIG. 6 is an enlarged partial perspective view of the kickstand assembly with the modular kickstand mechanism in the open position and extending outwardly from the electronic communications device.

As shown in FIG. 6, the back can provide and define an elongated cavity 128 which provides an elongated kickstand-receiving compartment 130 with an undercut kickstand-receiving pocket portion 132 positioned substantially parallel and in proximity to one of the lateral sides.

Figure 4:
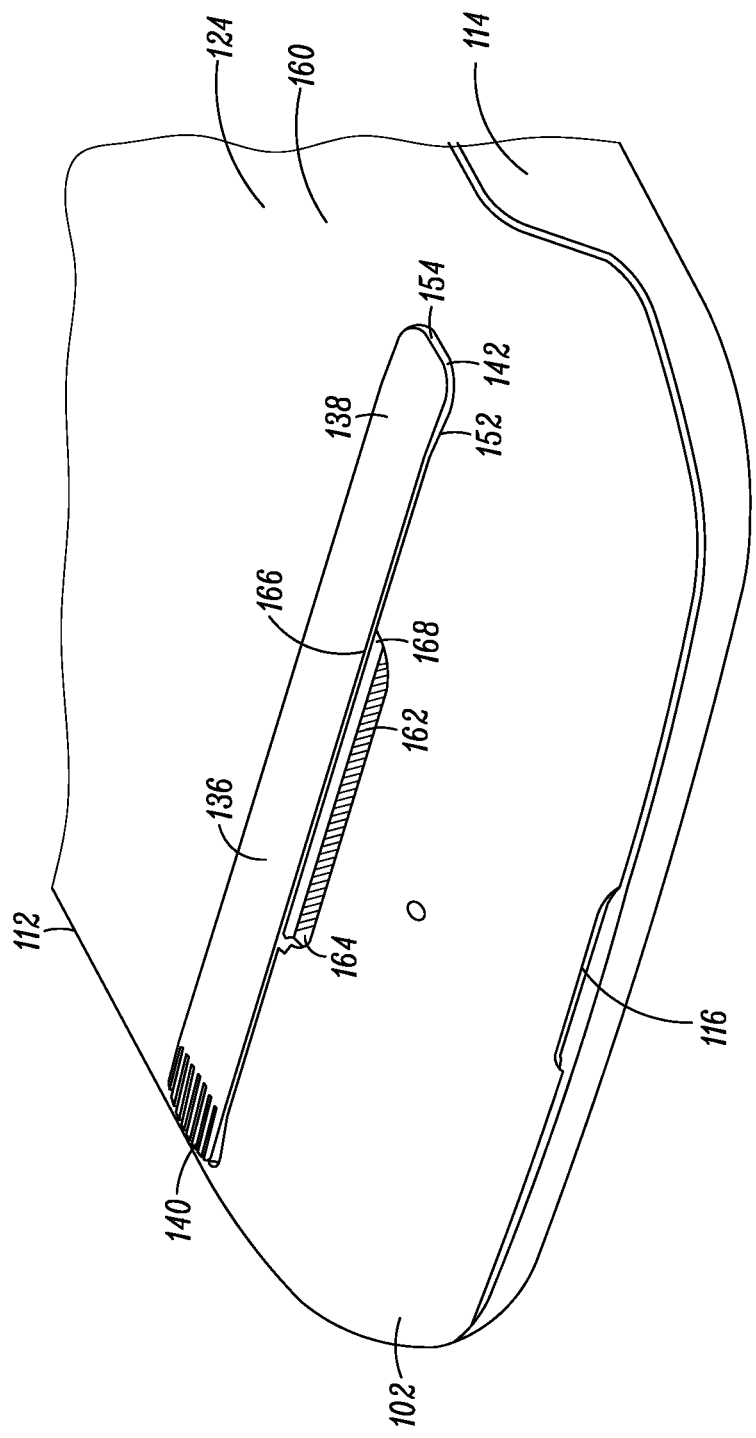
FIG. 4 is an enlarged partial perspective view of the kickstand assembly with the modular kickstand mechanism in the closed storage position in the electronic communications device.
Figure 5:
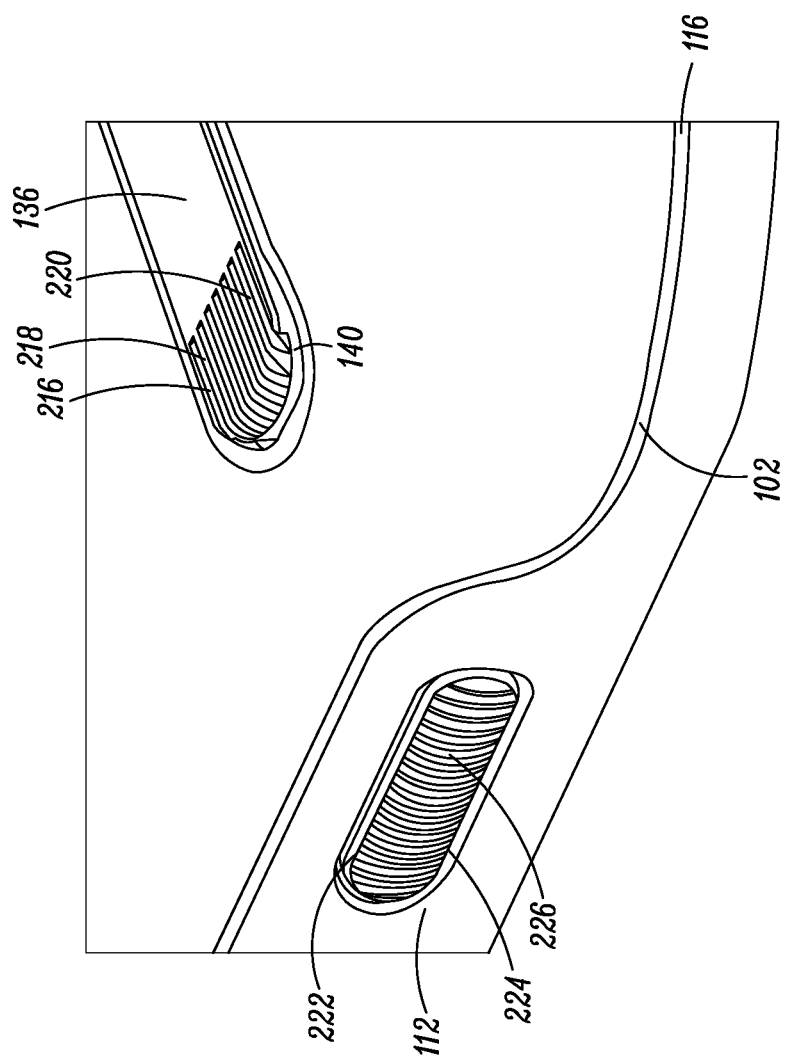
FIG. 5 is an enlarged partial lateral perspective view of the kickstand assembly with the modular kickstand mechanism in the closed storage position in the electronic communications device.

The kickstand assembly can comprise a modular electronic magnetic kickstand mechanism 134 (FIGS. 1-6) with an elongated electronic kickstand 136 comprising an elongated kickstand-arm 138 with a cantilevered inner end 140 which can be pivotally and integrally connected to the housing. The kickstand arm can comprise a bar or rod. The elongated kickstand-arm can have an outer contact end 142 which can be positioned opposite the inner end and can have an outwardly facing surface 144 and an inwardly facing surface 146 providing an underside 148. The kickstand-arm can comprise a strut and antennae 150 and can have an angled inclined tapered end portion 152 that can be positioned adjacent in proximity to the outer end of the elongated arm for increased performance. The outer contact end of the electronic kickstand comprising the elongated kickstand-arm of the modular kickstand mechanism can be pivotable and moveable from a closed storage position disposed within the kickstand-receiving compartment as shown in FIGS. 4 and 5 to an open position extending and disposed outwardly of the kickstand-receiving compartment as shown in FIGS. 1 and 6 for supporting the electronic communications device in the landscape orientation mode and/or in the portrait orientation mode. The outer contact end can provide an abutment chamfered frustroconical tip 154 for the elongated kickstand-arm for increased stability of the kickstand and can abuttingly engage a substantially horizontal planar or flat surface of a table, nightstand or other support surface. The outwardly facing surface of the elongated kickstand-arm can be positioned substantially flush to and in substantial coplanar alignment with the back surface of the housing when the outer end of the kickstand is moved to the closed storage position.

The modular electronic magnetic kickstand mechanism can include an inwardly facing magnet 156 (FIGS. 1, 2 and 6) which can comprise a kickstand-engaging hall-effect magnet that can be securely connected to and embedded in a countersunk magnet-receiving seat 158 providing a depression or indentation in the inwardly facing surface providing the underside of the elongated kickstand-arm. The magnet can be located adjacent and in proximity to the outer end of the kickstand. Advantageously, the inwardly facing magnet can be hidden from view and can be inaccessible to a user in the closed stored position of the kickstand. Desirably, the magnet can be visible and accessible to the user in the open position of the kickstand. The inwardly facing kickstand-engaging hall-effect magnet can comprise: a cylindrical magnet, magnetic connector, ferromagnetic connector, ferrimagnetic connector, magnetic fastener, ferromagnetic fastener, ferrimagnetic fastener, magnetic closure, steel magnet, magnetite magnet, iron magnet, iron-oxide magnetite magnet, hematite magnet, strontium-ferrite magnet, barium-ferrite magnet, cobalt-ferrite magnet, ceramic magnet, alnico magnet, ferrite magnet, rare earth magnet, samarium-cobalt magnet, neodymium magnet, aluminum-nickel iron-cobalt magnet, loadstone magnet, angled magnet, or combinations of any of the preceding.

At least one hall-effect sensor 160 (FIGS. 1, 4 and 6) which can comprise a hall-effect switch can be positioned within an interior of the electronic communications device and cooperate with the magnet for detecting the position of the kickstand when the kickstand is in the closed storage position and when the kickstand is in the open position. As shown in FIG. 6, the magnet at the tip of the kickstand can actuate the hall-effect switch when the kickstand is opened to trigger software in the circuitry of the electronics communications device to enhance the user interface (UI) when the electronics communications device is in the landscape mode as well as optionally in the portrait mode.

As shown in FIG. 4, the modular kickstand mechanism can include an elongated fingerpick 162 which can comprise an auxiliary electronic finger-graspable portion 164 on the underside of the kickstand which can be operatively and integrally connected to the elongated kickstand-arm for grasping and pivoting the elongated kickstand-arm. The fingerpick can allow easy affordance of the kickstand and can define an audio port 166 which can provide an audio speaker 168 and serve as a channel 170 for the audio speaker.

Figure 3:
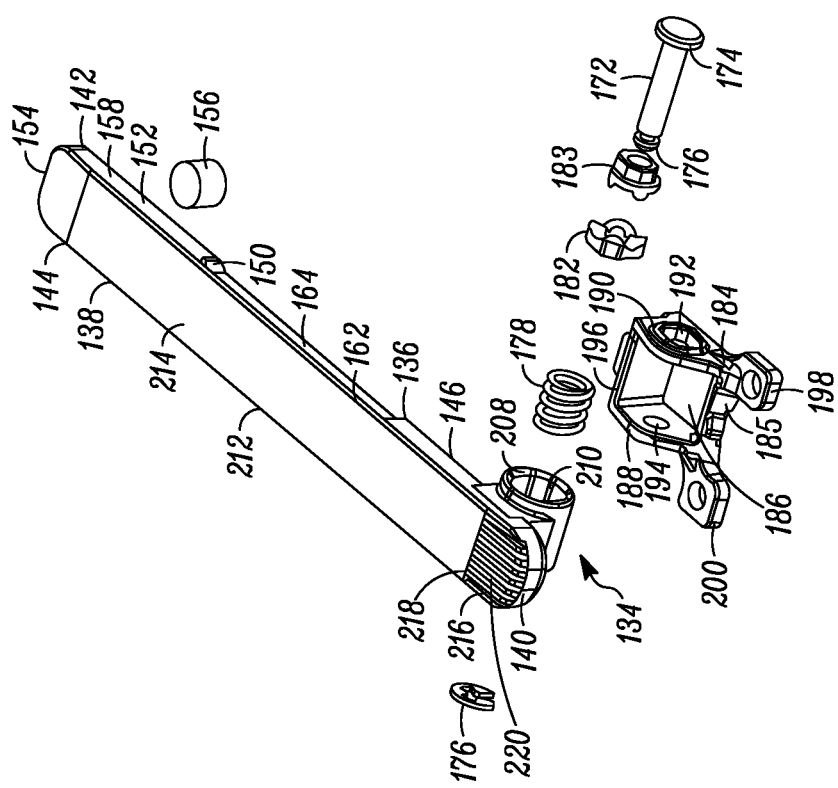
FIG. 3 is an exploded assembly view of the modular kickstand.

As best shown in FIG. 3, the modular kickstand mechanism can comprise a shaft 172 for accommodating pivoting of the kickstand. The shaft can have an enlarged head 174 at one end and having a narrow smaller diameter opposite end 176 for connection to an expandable clip 176. A spring 178 can be positioned about the shaft for biasing and urging the kickstand to the open position. The spring can be a coiled spring, compression spring, tension spring, helical spring, or a combination of any of the preceding springs. A slide cam 182 can be positioned about the shaft and an action cam 183 can be positioned about the shaft for engaging the slide cam to facilitate movement of the kickstand. A bracket 184 which can provide a modular base 185 can be provided for mounting the inner end of the kickstand to the housing. The bracket can have a seat 186 which can extend between and be integrally connected to parallel longitudinal wall plates 188 and 190 with shaft receiving holes 192 and 194. The seat can also extend between and be integrally connected to an outer wall 196. The bracket can have inner feet 198 and 200 and outer feet 202 (FIG. 2) with holes 204-206 (FIGS. 2 and 3) to receive bolts or other fasteners to secure the bracket to the housing. A tubular support member 208 can extend transversely across and be welded, molded or otherwise secured to the underside of the inner end of the kickstand for seating in the bracket. The tubular support member can have a central shaft-receiving opening 210 for receiving the shaft. The clip can have a maximum diameter and span that is greater than the maximum diameter of the shaft. The enlarged head can have a maximum diameter and span that is greater than the maximum diameter of the shaft.

The kickstand can have an elongated intermediate central body portion 212 (FIG. 3) with a general planar flat rectangular top surface 214 which extends longitudinally between and integrally connects the inner and outer ends of the kickstand. The inner end of the kickstand can have a finger-engageable surface 216 which can provide a set of substantially parallel kickstand-grooves 218 which can be separated by finger-graspable kickstand-ridges 220 that can provide raised kickstand-ribs for pushing and pressing the inner end of the elongated kickstand-arm to enhance opening and pivoting of the kickstand to the open position.

As shown in FIG. 5, the electronic communications device can have at least one side control 222 providing an image control for controlling the display of the images. The side control can have a set of substantially parallel control-grooves 224 separated by graspable side control-ridges 226 that can provide side control-ribs. The control can comprise at least one button, key, keypad, touchpad, power button, input button, pairing button, download button, output button, dial, knob, or combinations of any of the preceding.

The kickstand-grooves, kickstand-ridges and kickstand-ribs can be aesthetically similar and complementary to the control-grooves, side control-ridges, and side control-ribs. The kickstand opening feature can borrow styling cues from the side button and create an intuitive push here functionality to enhance the opening of the kickstand.

The images displayed on the electronic display comprising a screen can comprise one or more of the following: graphics, color graphics, black graphics, moving graphics, text, numbers, alpha numeric images, characters, icons, animation, video clips, logos, photographs, decorations, designs, symbols, information, and data.

The electronic communications device can comprise a portable electronic communications device, such as: a radiotelephone, cellular (cell) phone, mobile phone, smart phone, qwerty phone, flip phone, slider phone, android phone, tablet phone, camera phone, clamshell device, portable networking device, portable gaming device, mobile communications device, personal digital assistant (PDA), wireless e-mail device, a two way pager, internet communication device, ANDROID tablet, IPOD, IPAD, KINDLE, electronic reading device, electronic photo frame, digital photo frame, digital picture frame, video player, audio player, electronic calculator, portable digital television (TV), electronic monitor, blackberry, tablet device, video device, computer, netbook, data sharing device, wireless device, handheld electronic communications device, or a combination of any of the preceding.

The modular kickstand mechanism, kickstand, fingerpick, bracket, and tubular member can be of the same or different materials and can be fabricated or molded of: plastic, metal, impact-resistant plastic, non-magnetic metal, magnetically attractive metal, rigid material, composite material, wood, or combinations of any of these materials. The small modular base of the kickstand mechanism can result in less metal in the assembly and can achieve a lighter weight and improved antenna performance.

A hall-effect sensor is a transducer that varies its output voltage in response to a magnetic field. Hall-effect sensors can be used for location detection, positioning, proximity switching, and current sensing applications. The hall-effect sensor can operate as an analogue transducer and directly return a voltage. With a known magnetic field, its distance from the hall-plate of the hall-effect sensor can be determined. Using hall-effect sensors can also be used to measure current without interrupting the circuit. The hall-effect sensor can be combined with circuitry that allows the device to act in a digital (on/off) mode and can be characterized as a hall-effect switch.

Among the many advantages of the kickstand assembly and modular kickstand mechanism are:
1. Superior capability.
2. Superb performance.
3. Excellent modular kickstand.
4. Outstanding ability to detect the orientation, position and mode of the kickstand.
5. Improved antennae performance.
6. Enhances audio quality of the electronic communications device
7. Reliable.
8. Safe.
9. Lightweight.
10. Portable.
11. User friendly.
12. Easy to use.

13. Strong.
14. Sturdy.
15. Durable.
16. Dependable.
17. Economical.
18. Attractive.
19. Efficient.
20. Effective.

Although embodiments of the invention have been shown and described, it is to be understood that various modifications, substitutions, and rearrangements of parts, components, and/or process (method) steps, as well as other uses of the kickstand assembly, modular kickstand mechanism and electronic communications device can be made by those skilled in the art without departing from the novel spirit and scope of this invention.

What is claimed is:

1. A kickstand assembly, comprising:
    an electronic communications device being moveable from a landscape orientation to a portrait orientation and vice versa, said electronic communications device comprising
    a housing having a front comprising a frame with a front surface and having a back with a back surface;
    an electronic visual display secured to said frame in proximity to said front surface for displaying images;
    a kickstand mechanism operatively connected to the back of said housing;
    said back defining a cavity providing a kickstand compartment for receiving said kickstand mechanism;
    said kickstand mechanism having a kickstand comprising an arm with an inner end pivotally connected to said housing and an outer end positioned opposite said inner end, said outer end being movable from a closed storage position within said kickstand compartment to an open position disposed outwardly of said kickstand compartment for supporting said electronic communications device in one of said orientations, and said kickstand mechanism having a magnet secured to said outer end of said kickstand; and
    a sensor cooperating with said magnet for detecting the position of said kickstand.

2. A kickstand assembly in accordance with claim 1 wherein said kickstand mechanism comprises a channel for an audio speaker.

3. A kickstand assembly in accordance with claim 1 wherein said kickstand mechanism comprises an antenna.

4. A kickstand assembly in accordance with claim 1 wherein said kickstand mechanism comprises a portion for facilitating grasping of said arm.

5. A kickstand assembly in accordance with claim 1 wherein an inner end of said kickstand has grooves for enhancing moving of said kickstand to the open position.

6. A kickstand assembly in accordance with claim 1 wherein said kickstand mechanism includes a biasing mechanism for biasing said kickstand toward the open position.

7. A kickstand assembly in accordance with claim 1 wherein said kickstand mechanism comprises at least one cam for facilitating movement of said kickstand.

8. A kickstand assembly in accordance with claim 1 wherein said kickstand mechanism defines a speaker port and has a portion for enhancing audio quality and substantially preventing blocking of an audio path to said speaker port.

9. A kickstand assembly in accordance with claim 1 wherein said electronic communications device includes at least one control for controlling the display of said images.

10. A kickstand assembly in accordance with claim 1 wherein said electronic communications device comprises a portable electronic device selected from the group consisting of: a radiotelephone, cellular (cell) phone, mobile phone, smart phone, qwerty phone, flip phone, slider phone, android phone, tablet phone, camera phone, clamshell device, portable networking device, portable gaming device, mobile communications device, personal digital assistant (PDA), wireless e-mail device, a two way pager, internet communication device, electronic reading device, electronic photo frame, digital photo frame, digital picture frame, video player, audio player, electronic calculator, portable digital television (TV), electronic monitor, tablet device, video device, computer, netbook, data sharing device, wireless device, handheld electronic communications device, and combinations of any of the preceding.

11. A kickstand assembly, comprising:
    an electronic communications device being moveable from a landscape mode to a portrait mode and vice versa, said electronic communications device comprising
    an electronic visual display for displaying images, said electronic visual display comprising a user interface;
    a housing having a front comprising a generally rectangular frame with a front surface and having a back with a back surface, said frame positioned about and securing said electronic visual display, and said back defining an elongated cavity providing a kickstand-receiving compartment;
    a magnetic kickstand mechanism having an electronic kickstand comprising an elongated arm with an inner end pivotally connected to said housing, an outer end positioned opposite said inner end, an outwardly facing surface and an inwardly facing surface providing an underside, said outer end of said elongated arm being movable from a closed storage position disposed within said kickstand-receiving compartment to an open position disposed outwardly of said kickstand-receiving compartment for supporting said electronic communications device in one of said modes, and said magnetic kickstand mechanism having a magnet secured to said underside of said elongated arm in proximity to said outer end of said kickstand; and
    a hall-effect sensor positioned within an interior of said electronic communications device and cooperating with said magnet for detecting the position of said kickstand.

12. A kickstand assembly in accordance with claim 11 wherein said magnetic kickstand mechanism comprises a fingerpick operatively connected to said elongated arm for grasping and pivoting said elongated arm, and said fingerpick defines an audio port providing an audio speaker and a channel for said audio speaker.

13. A kickstand assembly in accordance with claim 11 wherein said elongated arm provides an antenna and has an angled end portion in proximity to said outer end for increasing stability of said kickstand, and said electronic arm is pivotally and integrally connected to said housing of said electronic communications device to form part of said electronic communications device rather than and in the absence of being part of a separate case for enclosing and encasing said electronic communications device.

14. A kickstand assembly in accordance with claim 11 wherein:
    said magnetic kickstand mechanism comprises a shaft for accommodating pivoting of said kickstand, a spring operatively associated with said shaft for biasing said kickstand to the open position, at least one cam positioned about said shaft for facilitating movement of said kickstand, a bracket for mounting said inner end of said kickstand to said housing, and a tubular support member secured to said underside of said inner end of said elongated arm for seating in said bracket and receiving said shaft; and said magnet comprises a kickstand-magnet selected from the group consisting of: a hall-effect magnet, kickstand-engaging magnet, cylindrical magnet, magnetic connector, ferromagnetic connector, ferrimagnetic connector, magnetic fastener, ferromagnetic fastener, ferrimagnetic fastener, magnetic closure, steel magnet, magnetite magnet, iron magnet, iron-oxide magnetite magnet, hematite magnet, strontium-ferrite magnet, barium-ferrite magnet, cobalt-ferrite magnet, ceramic magnet, alnico magnet, ferrite magnet, rare earth magnet, samarium-cobalt magnet, neodymium magnet, aluminum-nickel iron-cobalt magnet, loadstone magnet, angled magnet, and combinations of any of the preceding.

15. A kickstand assembly in accordance with claim 11 wherein:

said electronic visual display comprises a screen selected from the group consisting of: an impact resistant screen, a display screen, a touchscreen, a screen with an accelerator, and combinations of any of the preceding;

said electronic communications device comprises at least one control for controlling the display of said images, said control comprising an image control selected from the group consisting of at least one button, key, a keypad, touchpad, power button, input button, pairing button, download button, output button, dial, knob, and combinations of any of the preceding;

said inner end of said kickstand has a finger-engageable surface complementary to said control for enhancing moving of said kickstand to the open position;

said images are selected from the group consisting of: graphics, color graphics, black graphics, moving graphics, text, numbers, alpha numeric images, characters, icons, animation, video clips, logos, photographs, decorations, designs, symbols, information, data, and combinations of the preceding;

said electronic communications device comprises a portable electronic device selected from the group consisting of: a radiotelephone, cellular (cell) phone, mobile phone, smart phone, qwerty phone, flip phone, slider phone, android phone, tablet phone, camera phone, clamshell device, portable networking device, portable gaming device, mobile communications device, personal digital assistant (PDA), wireless e-mail device, a two way pager, internet communication device, electronic reading device, electronic photo frame, digital photo frame, digital picture frame, video player, audio player, electronic calculator, portable digital television (TV), electronic monitor, tablet device, video device, computer, netbook, data sharing device, wireless device, handheld electronic communications device, and combinations of any of the preceding.

16. A kickstand assembly, comprising:

an electronic communications device being moveable from a landscape orientation mode to a portrait orientation mode and vice versa, said electronic communications device comprising an electronic visual display for displaying images, said electronic visual display comprising a user interface;

an impact-resistant housing having substantially parallel longitudinal sides, substantially parallel lateral sides extending between and connected to said substantially parallel longitudinal sides, a front comprising a generally rectangular frame with a front surface and having a back with a back surface, said frame positioned peripherally about and securing said electronic visual display, said back defining an elongated cavity providing an elongated kickstand-receiving compartment with an undercut kickstand-receiving pocket portion positioned substantially parallel and in proximity to one of said lateral sides;

a modular electronic magnetic kickstand mechanism having an elongated electronic kickstand comprising an elongated kickstand-arm with a cantilevered inner end pivotally and integrally connected to said housing, said elongated kickstand-arm having an outer contact end positioned generally opposite said inner end and having an outwardly facing surface and an inwardly facing surface providing an underside, said outer contact end of said electronic kickstand comprising said elongated kickstand-arm being pivotable from a closed storage position disposed within said kickstand-receiving compartment to an open position disposed outwardly of said kickstand-receiving compartment for supporting said electronic communications device in said landscape orientation mode and/or in said portrait orientation mode, said outer contact end providing an abutment tip for abutting engaging a substantially horizontal planar surface or a table, nightstand or other support surface, said outwardly facing surface of said elongated kickstand-arm positioned substantially flush to and in substantial coplanar alignment with said back surface of said housing when said outer end of said kickstand is moved to said closed storage position, and said modular electronic magnetic kickstand mechanism including an inwardly facing magnet securely connected to said inwardly facing surface providing said underside of said elongated kickstand-arm in proximity to said outer end of said kickstand, said inwardly facing magnet being hidden from view and inaccessible to a user in the closed stored position of said electronic kickstand, and said inwardly facing magnet being visible and accessible to the user in the open position; and at least one hall-effect sensor comprising a hall-effect switch positioned within an interior of said electronic communications device and cooperating with said magnet for detecting the position of said kickstand when said kickstand is in said closed storage position and when said kickstand in said open position.

17. A kickstand assembly in accordance with claim 16 wherein said modular electronic magnetic kickstand mechanism comprises an elongated fingerpick comprising an auxiliary electronic finger-graspable portion operatively and integrally connected to said elongated kickstand-arm for grasping and pivoting said elongated kickstand-arm, and said fingerpick defines an audio port providing an audio speaker and a channel for said audio speaker.

18. A kickstand assembly in accordance with claim 16 wherein:

said electronic kickstand comprises an antennae; and said elongated kickstand-arm comprises a strut and has an angled inclined tapered end portion in proximity to said outer end of said elongated arm and said tip comprises a chamfered frustroconical tip for increasing stability of said kickstand.

19. A kickstand assembly in accordance with claim 16 wherein:

said modular electronic magnetic kickstand mechanism comprises a shaft for accommodating pivoting of said kickstand, said shaft having an enlarged head at one end and having an opposite end, a clip for connecting said opposite end, a spring positioned about said shaft for biasing and urging said kickstand to the open position, a slide cam positioned about said shaft, an action cam positioned about said shaft for engaging said slide cam to facilitate movement of said kickstand, a bracket providing a modular base for mounting said inner end of said kickstand to said housing, and a tubular support member extending transversely across and secured to the underside of said inner end of said kickstand for seating in said bracket, said tubular support member having a central shaft-receiving opening having a maximum diameter and span for receiving said shaft, said clip having a maximum diameter greater than the maximum diameter of said shaft, and said enlarged head having a maximum diameter greater than the maximum diameter of said shaft;

said spring is selected from the group consisting of: a coiled spring, compression spring, tension spring, helical spring, and combinations of any of the preceding; and said inwardly facing magnet comprises a kickstand-engaging hall-effect magnet selected from the group consisting of: a cylindrical magnet, magnetic connector, ferromagnetic connector, ferrimagnetic connector, magnetic fastener, ferromagnetic fastener, ferrimagnetic fastener, magnetic closure, steel magnet, magnetite magnet, iron magnet, iron-oxide magnetite magnet, hematite magnet, strontium-ferrite magnet, barium-ferrite magnet, cobalt-ferrite magnet, ceramic magnet, alnico magnet, ferrite magnet, rare earth magnet, samarium-cobalt magnet, neodymium magnet, aluminum-nickel iron-cobalt magnet, loadstone magnet, angled magnet, and combinations of any of the preceding.

20. A kickstand assembly in accordance with claim 16 wherein:

said electronic visual display comprises a screen selected from the group consisting of: an impact resistant screen, a display screen, a touchscreen, a screen with an accelerator, and combinations of any of the preceding;

said electronic communications device comprises at least one control for controlling the display of said images, said control comprising an image control with a set of control-grooves, and said image control is selected from the group consisting of: at least one button, key, a keypad, touchpad, power button, input button, pairing button, download button, output button, dial, knob, and combinations of any of the preceding;

said inner end of said kickstand has a finger-engageable surface defining a set of substantially parallel kickstand-grooves separated by finger-graspable ridges comprising raised ribs for pushing said inner end of said elongated kickstand-arm to enhance opening and pivoting of said kickstand to the open position, and said kickstand-grooves are aesthetically similar and complementary to said control-grooves;

said images are selected from the group consisting of: graphics, color graphics, black graphics, moving graphics, text, numbers, alpha numeric images, characters, icons, animation, video clips, logos, photographs, decorations, designs, symbols, information, data, and combinations of the preceding; and said electronic communications device comprises a portable electronic communications device selected from the group consisting of: a radiotelephone, cellular (cell) phone, mobile phone, smart phone, qwerty phone, flip phone, slider phone, android phone, tablet phone, camera phone, clamshell device, portable networking device, portable gaming device, mobile communications device, personal digital assistant (PDA), wireless e-mail device, a two way pager, internet communication device, electronic reading device, electronic photo frame, digital photo frame, digital picture frame, video player, audio player, electronic calculator, portable digital television (TV), electronic monitor, tablet device, video device, computer, netbook, data sharing device, wireless device, handheld electronic communications device, and combinations of any of the preceding.

* * * * *